United States Patent
Ross et al.

(10) Patent No.: US 9,158,904 B1
(45) Date of Patent: *Oct. 13, 2015

(54) FACIAL RECOGNITION

(71) Applicant: Google Inc., Mountain View, CA (US)

(72) Inventors: Steven James Ross, Allison Park, PA (US); Henry Will Schneiderman, Pittsburgh, PA (US); Michael Christian Nechyba, Pittsburgh, PA (US); Yong Zhao, San Jose, CA (US)

(73) Assignee: Google Inc., Mountain View, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/079,941

(22) Filed: Nov. 14, 2013

Related U.S. Application Data

(63) Continuation of application No. 13/738,744, filed on Jan. 10, 2013, now Pat. No. 8,611,616, which is a continuation of application No. 13/533,682, filed on Jun. 26, 2012, now Pat. No. 8,396,265.

(51) Int. Cl.
*G06K 9/00* (2006.01)
*G06F 21/32* (2013.01)
*H04N 5/225* (2006.01)

(52) U.S. Cl.
CPC ............ *G06F 21/32* (2013.01); *G06K 9/00288* (2013.01)

(58) Field of Classification Search
CPC ................................... G06K 9/00; H04N 1/00
USPC ........... 382/103, 107, 236; 348/169–172, 352
See application file for complete search history.

(56) References Cited

U.S. PATENT DOCUMENTS

| | | | |
|---|---|---|---|
| 6,572,014 B1 | 6/2003 | Lambert | |
| 6,879,709 B2 | 4/2005 | Tian et al. | |
| 7,084,734 B2 | 8/2006 | Singh | |
| 7,266,225 B2 * | 9/2007 | Mariani et al. | 382/118 |
| 7,319,780 B2 | 1/2008 | Fedorovskaya et al. | |
| 7,362,887 B2 | 4/2008 | Oohashi et al. | |
| 7,379,559 B2 | 5/2008 | Wallace et al. | |
| 7,421,097 B2 * | 9/2008 | Hamza et al. | 382/118 |
| 7,487,112 B2 | 2/2009 | Barnes, Jr. | |
| 7,492,943 B2 | 2/2009 | Li et al. | |
| 7,697,735 B2 | 4/2010 | Adam et al. | |
| 7,848,566 B2 | 12/2010 | Schneiderman | |
| 7,991,388 B1 | 8/2011 | Becker et al. | |

(Continued)

OTHER PUBLICATIONS

Brian, "Can Android's new 'Face Unlock feature be hacked using a photo? Google says no," The next Web, retrieved at http://thenextweb.com/google/2011/10/20/can-androids-new-face-unlock-feature-be-hacked-using-a-photo-google-says-no/, Oct. 20, 2011, 1 pp.

(Continued)

*Primary Examiner* — Abolfazl Tabatabai
(74) *Attorney, Agent, or Firm* — Shumaker & Sieffert, P.A.

(57) ABSTRACT

An example method includes capturing, by an image capture device of a computing device, an image of a face of a user. The method further includes detecting, by the computing device, whether a distance between the computing device and an object represented by at least a portion of the image is less than a threshold distance, and, when the detected distance is less than a threshold distance, denying authentication to the user with respect to accessing one or more functionalities controlled by the computing device, where the authentication is denied independent of performing facial recognition based at least in part on the captured image.

20 Claims, 7 Drawing Sheets

(56) References Cited

U.S. PATENT DOCUMENTS

| | | |
|---|---|---|
| 8,059,870 B2 | 11/2011 | Ren et al. |
| 8,063,889 B2 | 11/2011 | Anderson |
| 8,149,089 B2 | 4/2012 | Lin et al. |
| 8,150,108 B2 | 4/2012 | Miller |
| 8,194,938 B2 | 6/2012 | Wechsler et al. |
| 8,254,647 B1 | 8/2012 | Nechyba et al. |
| 8,261,090 B1 * | 9/2012 | Matsuoka .................... 713/186 |
| 8,275,175 B2 | 9/2012 | Baltatu et al. |
| 8,611,616 B1 * | 12/2013 | Ross et al. .................... 382/118 |
| 2006/0288234 A1 | 12/2006 | Azar et al. |
| 2007/0009139 A1 | 1/2007 | Landschaft et al. |
| 2011/0151934 A1 | 6/2011 | Geng |
| 2011/0191840 A1 | 8/2011 | Ortiz et al. |
| 2012/0081282 A1 | 4/2012 | Chin |
| 2012/0235790 A1 | 9/2012 | Zhao et al. |

OTHER PUBLICATIONS

U.S. Appl. No. 13/533,682, by Steven James Ross, filed Jun. 26, 2012.
U.S. Appl. No. 13/533,723, by Yong Zhao, filed Jun. 26, 2012.
U.S. Appl. No. 13/533,811, by Michael Sipe, filed Jun. 26, 2012.
U.S. Appl. No. 13/533,834, by Michael Nechyba, filed Jun. 26, 2012.
U.S. Appl. No. 13/738,744, by Steven James Ross, filed Jan. 10, 2013.
Oh Gizmo!, Motion-Based Cell Phone Unlock, http://www.ohgizmo.com/2009/04/17/motion-based-cell-phone-unlock/, downloaded from Internet: Aug. 8, 2012, 4 pp.

* cited by examiner

FACIAL RECOGNITION

This application is a continuation of U.S. application Ser. No. 13/738,744, filed Jan. 10, 2013, which is a continuation of U.S. application Ser. No. 13/533,682, now U.S. Pat. No. 8,396,265, filed Jun. 26, 2012.

TECHNICAL FIELD

This disclosure relates to facial recognition technology.

BACKGROUND

A user may activate or otherwise gain access to functionalities controlled by a computing device by "unlocking" the device. In some instances, a computing device may be configured to permit unlocking based on authentication information provided by the user. Authentication information may take various forms, including alphanumeric passcodes and biometric information. Examples of biometric information include fingerprints, retina scans, and facial images. A computing device may authenticate a facial image input using facial recognition technology.

SUMMARY

In one example, a method includes capturing, by an image capture device coupled to a computing device, an image of a face of a user. The method further includes, detecting, by the computing device, whether a distance between the computing device and an object represented by at least a portion of the image is less than a threshold distance, and, when the detected distance is less than a threshold distance, denying authentication to the user with respect to accessing one or more functionalities controlled by the computing device, where the authentication is denied independent of performing facial recognition based at least in part on the captured image.

In another example, a computer-readable storage device includes instructions for causing at least one processor of a computing device to perform operations. The operations include capturing, by an image capture device of a computing device, an image of a face of a user. The operations further include detecting, by the computing device, whether a distance between the computing device and an object represented by at least a portion of the image is less than a threshold distance, and, when the detected distance is less than a threshold distance, denying authentication to the user with respect to accessing one or more functionalities controlled by the computing device, where the authentication is denied independent of performing facial recognition based at least in part on the captured image.

In another example, a computing device includes at least one processor and at least one image capture device. The image capture device is operable to capture an image of a face of a user. The at least one processor is configured to detect whether a distance between the computing device and an object represented by at least a portion of the image is less than a threshold distance, and when the detected distance is less than a threshold distance, deny authentication to the user with respect to accessing one or more functionalities controlled by the computing device, where the authentication is denied independent of performing facial recognition based at least in part on the captured image.

In another example, a method includes capturing, by an image capture device coupled to a computing device, an enrollment image associated with an authorized user of the computing device, and detecting, by the computing device, an estimated distance between the computing device and an object represented by at least a portion of the enrollment image. The method further includes measuring, by the computing device, a first measured distance between the computing device and the object represented by at least the portion of the enrollment image, and generating, by the computing device, a correction factor at least in part by dividing the first measured distance by the estimated distance. The method further includes capturing, by the image capture device of the computing device, an authentication image, and by the computing device, a second measured distance between the computing device and an object represented by at least a portion of the authentication image. The method further includes dividing the second measured distance by the correction factor to obtain an expected actual distance, and detecting an actual distance. The method further includes determining whether the actual distance matches the expected actual distance, and, when the actual distance does not match the expected actual distance, denying authentication to a user with respect to accessing one or more functionalities controlled by the computing device, where the authentication is denied independent of performing facial recognition based at least in part on the authentication image and the enrollment image.

The details of one or more examples are set forth in the accompanying drawings and the description below. Other features, objects, and advantages will be apparent from the description and drawings, and from the claims.

DETAILED DESCRIPTION

Figure 1A:
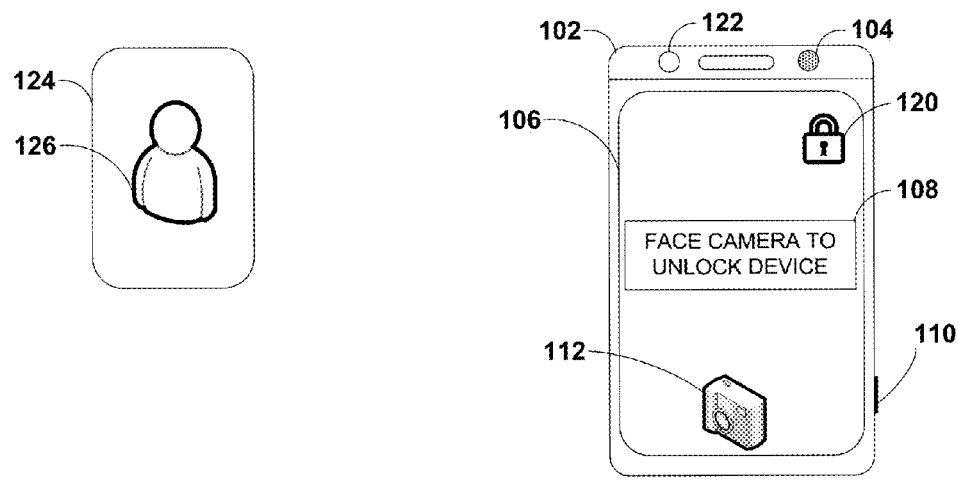
FIGS. 1A-1B are conceptual diagrams illustrating an example computing device that may be used to detect possible spoofing in captured facial images, in accordance with one or more aspects of the present disclosure.

A computing device may use facial recognition programs in various scenarios. For example, a computing device may use facial recognition programs to authenticate a user who attempts to gain access to one or more functionalities of the computing device or functionalities otherwise controlled by the computing device. In some common scenarios, a computing device may store images of the faces of one or more authorized users (such as "enrollment images") and/or mathematical representations of the faces of the authorized users (such as "templates"). When a user attempts to gain access to functionalities of (or "unlock") the computing device, the computing device (or an associated peripheral device) may capture an image of the user's face for authentication purposes. The computing device may then use facial recognition programs to compare the captured facial image to the enrollment images or templates associated with authorized users. If the facial recognition programs determine an acceptable level of match between the captured facial image and at least one enrollment image or template, the computing device may authenticate the user, and grant the unlock request.

Unauthorized users may attempt to leverage vulnerabilities of facial recognition programs to cause erroneous authentication. For example, an unauthorized user may attempt to unlock a computing device using "spoofing" techniques. To cause erroneous authentication by spoofing, an unauthorized user may present an image of a face of an authorized user for capture by the computing device. For example, an unauthorized user may present to the computing device a printed picture of the authorized user's face or obtain a video or digital image of an authorized user on a second computing device (e.g., by pulling up an authorized user's profile picture from a social networking website). Thus, an unauthorized user may attempt to use spoofing methods to gain access to functionalities of the computing device to overcome authentication constraints otherwise implemented by the computing device.

In general, this disclosure is directed to techniques for preventing erroneous authentication caused by spoofing. A computing device may implement one or more anti-spoofing techniques that detect suspected attempts to spoof, and prevent erroneous authentication due to spoofing. In some examples, the anti-spoofing techniques may be performed by programs that use one or more hardware components (e.g., a proximity sensor) of (or associated with) the computing device, such as a proximity sensor, to determine the actual distance between the computing device and the object represented in the captured facial image. More specifically, the anti-spoofing programs may use a proximity sensor to verify that the object being viewed is an actual face, and not a reproduction of a face, based upon the distance to the face corresponding to the actual face dimensions. In other examples, the anti-spoofing programs may determine or estimate a number of pixels between two or more facial features represented in the captured facial image. In still other examples, the anti-spoofing programs may use multiple hardware components of (or associated with) the computing device (e.g., a proximity sensor and an infrared emitter) to obtain multiple readings of the distance from the computing device to the object of the facial image. The anti-spoofing programs may then generate a correction factor based on the multiple readings, and apply the correction factor to subsequent readings obtained when images are captured during a subsequent facial recognition device unlock attempt. The anti-spoofing programs may also use the multiple readings to generate an acceptable margin of error for future readings.

The anti-spoofing programs described herein may reduce the occurrence of an unauthorized user causing erroneous authentication by spoofing. For example, the anti-spoofing programs may cause the facial recognition programs to deny authentication to a user if the object of the facial image is closer than a threshold distance from the computing device. In another example, the anti-spoofing programs may deny authentication to a user prior to analyzing the facial image using facial recognition programs if the facial image includes more or fewer than an acceptable range of number of pixels between two or more facial features (e.g., between the respective corneas of the left and right eyes). In this manner, techniques of the present disclosure may reduce the occurrence of erroneous authentication caused by spoofing. In addition, the anti-spoofing programs may reduce the usage of the facial recognition programs, thus conserving computing resources and reducing power consumption (e.g., extending battery life in mobile computing devices).

Figure 1B:
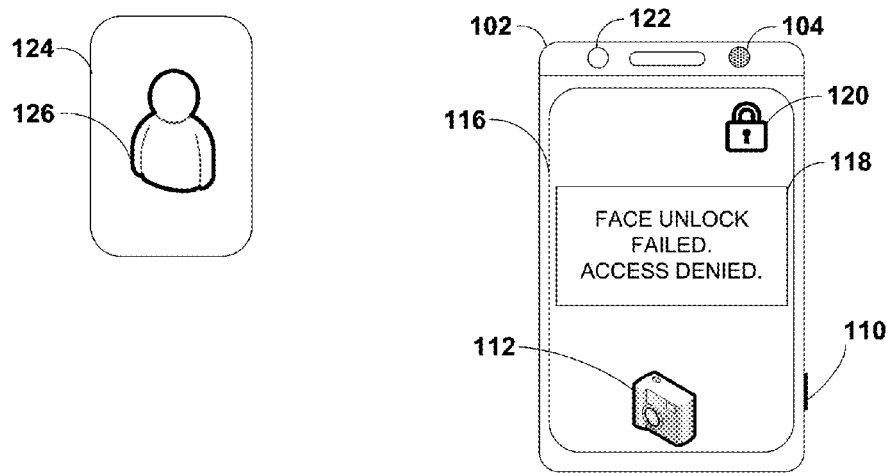

FIGS. 1A & 1B are conceptual diagrams illustrating an example computing device for detecting possible spoofing in captured facial images, in accordance with one or more aspects of the present disclosure. FIG. 1A illustrates computing device 102 that may capture facial images associated with a user (e.g., authorized user 126), analyze the captured facial image for possible spoofing, and determine whether to allow or deny authentication based on the analysis. Computing device 102 may include, be, or be part of one or more of a variety of types of devices, such as a mobile phone (including a smartphone), tablet computer, netbook, laptop, desktop, personal digital assistant ("PDA"), set-top box, television, biometric door lock, and watch, among others.

In the example of FIG. 1A, computing device 102 includes camera lens 104. In the example of FIG. 1A, camera lens 104 may be part of or coupled to a front-facing camera of computing device 102. In other examples, camera lens 104 may be part of or coupled to a rear-facing camera of computing device 102. One or both of the front-facing and rear-facing cameras may be capable of capturing still images, video, or both. It will be appreciated that in still other embodiments (not separately shown), the image capture device (e.g., camera, sensor, etc.) may be separate from, but communicatively connected to the computing device.

Additionally, in the example of FIG. 1A, computing device 102 includes proximity sensor 122. Proximity sensor 122 enables computing device 102 to discern a physical distance between computing device 102 and an object that is external to computing device 102 and within range of detection by the proximity sensor 122 (e.g., image 124). Proximity sensor 122 may implement one or more sensing technologies, including, for example, capacitive displacement, laser rangefinder technology, magnetic sensing technology, infrared proximity sensing technology, photometric (or reflective) technology, radar, ionizing, and sonar sensor technology, to name a few. In examples other than the one illustrated in FIG. 1A, a computing device in accordance with this disclosure may include two or more proximity sensors. In some such examples, the proximity sensors may implement different types of sensing technologies. For example, a first proximity sensor may implement laser rangefinder technology while a second proximity sensor may implement infrared proximity sensing technology.

In the example of FIG. 1A, computing device 102 may include a display device that displays graphical user interface (GUI) 106. GUI 106 may be displayed by a variety of display devices, including input/output capable devices such as a touchscreen or presence-sensitive display. As shown in the example of FIG. 1A, GUI 106 may include one or more GUI elements, such as lock indicator 120, unlock prompt 108, and capture icon 112.

Computing device 102 may be configured to operate in a "locked" mode, represented by the presence of lock indicator 120. In some examples, a user may actively configure computing device 102 to operate in locked mode. For example, a user may press a button (such as button 110) for a predetermined length of time to request computing device 102 to operate in locked mode. In these and other examples, a user may tap, swipe, or otherwise interact with one or more elements of GUI 106, using an input/output capable display of computing device 102. Computing device 102 may also be configured to operate in locked mode by passive means. For example, a predetermined period of inactivity may configure computing device 102 to operate in locked mode. Inactivity may occur due to an absence of user interaction (e.g., through button presses, contact with an input/output capable display device, etc.). The predetermined time period that configures computing device 102 to operate in locked mode may be a default time period specified by a manufacturer of computing device 102, or may be programmed by an authorized user, such as authorized user 126.

In some examples, computing device 102 may utilize facial recognition technology to stop operation in locked mode. In other words, authorized user 126 may unlock computing device 102 by authentication methods that use facial recognition techniques to determine whether authorized user 126 is an authorized user of device 102. More specifically, authorized user 126 may set up a facial recognition application or embedded process of computing device 102 by storing an enrollment image or template that represents the face of authorized user 126. Authorized user 126 may cause a camera of computing device 102 to capture the authentication using camera lens 104. Computing device 102 may store the enrollment image or template to one or more storage devices of computing device 102, and/or to a remote location, commonly known as "cloud storage." As used herein, a template may represent various mathematical expressions of a facial image. For example, a template may include values and value transitions associated with brightness, tone, contrast, and other image-based metrics. In some instances, a template may include vector quantizations associated with a facial image. For example, such a template may express pixel transitions (or "spatial frequencies") on a facial image as wavelets, and derive wavelet coefficients among two or more of the wavelets. The wavelet coefficients may represent all or a portion of the facial image. While techniques of this disclosure may be performed using one or both of enrollment images and templates, for purposes of example, the techniques are described mainly with respect to enrollment images.

To unlock computing device 102 using facial recognition technology, a user (such as authorized user 126) may provide an authentication image that represents at least a portion of his/her face. In some examples, the user may actively cause a camera of computing device 102 to capture the authentication image. For example, the user may face camera lens 104 and press button 110 to cause the camera to capture the authentication image. In another example, the user may tap, swipe, or otherwise interact with an area associated with capture icon 112 included in GUI 106. In still other examples, computing device 102 may automatically capture the authentication image in response to the user facing camera lens 104. As shown in the example of FIG. 1A, computing device 102 may display GUI 106 to include unlock prompt 108. In this example, unlock prompt 108 indicates that the user may simply face a camera, which may include or be otherwise coupled to camera lens 104, to cause computing device 102 to capture the authentication image. For example, when the user faces camera lens 104, computing device 102 may use a facial recognition program to determine that the image currently captured through camera lens 104 includes a representation of a human face.

Computing device 102 may then compare the captured authentication image with the enrollment image, and determine whether or not the images are sufficiently similar to each other for facial recognition purposes. For example, computing device 102 may utilize one or more facial recognition programs to compare metrics associated with the authentication image to metrics associated with the enrollment image. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 102 may perform the comparison using one or more well-known recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few. Based on comparison-based values, such as preprogrammed acceptable margins of error, facial recognition programs running on computing device 102 may determine whether or not the authentication image and the enrollment image are sufficiently similar to one another for facial recognition. In instances where the facial recognition programs grant a match, the user may successfully unlock computing device 102. Conversely, if the facial recognition programs deny a match, the user may be unable to unlock computing device 102, and computing device 102 may continue to operate in locked mode.

However, an unauthorized user may exploit vulnerabilities of commonly used facial recognition technologies to gain access to unlock computing device 102. For example, if an unauthorized user gains possession of computing device 102 while computing device 102 is configured in locked mode, the unauthorized user may attempt to unlock computing device 102, as solicited by unlock prompt 108. To successfully authenticate, the unauthorized user may spoof one or more facial recognition programs running on computing device 102 by presenting image 124, which includes a visual representation of authorized user 126. Image 124 may take various forms, such as a still photo in printed form, still photo in digital form, or one or more frames of a video. In one example where image 124 is a digital still photo, the unauthorized user may invoke image 124 using a second computing device (not shown). For example, the unauthorized user may use the Internet to access a profile picture that authorized user 126 posted to a social networking website. Using image 124, an unauthorized user may attempt to spoof the facial recognition programs running on computing device 102 and illicitly unlock computing device 102 without the permission of authorized user 126.

Computing device 102 may implement techniques of this disclosure to detect attempts to spoof the facial recognition programs using image 124. In some examples, an unauthorized user may place image 124 within relatively close proximity to camera lens 104 in attempting to spoof a facial recognition program. In some examples, computing device 102 may use proximity sensor 122 to determine the actual physical distance between computing device 102 and image 124. In these and other examples, computing device may alternatively or additionally determine the distance by capturing an authentication image of image 124, and then calculate a number of pixels between two or more landmarks within image 124. For example, computing device 102 may identify areas of image 124 that are associated with the eyes of authorized user 126 as landmarks. The greater the number of pixels between the eyes, the closer image 124 may be to positioned computing device 102.

Computing device 102 may compare a detected distance between image 124 and computing device 102 to an expected distance, and reject the unlock attempt if the detected distance and the expected distance do not match. In one example aspect, when computing device 102 detects that the number of pixels between the eyes exceeds a preprogrammed threshold (e.g., a number of pixels associated with a distance of 10 centimeters), computing device 102 may identify this as an attempt to spoof the facial recognition programs running on computing device 102. In this manner, computing device 102 may implement techniques of this disclosure to prevent erroneous authentication by spoofing.

Computing device 102 may implement techniques of this disclosure to deny authentication at various times. In one implementation, computing device 102 may deny authentication based on a detected spoofing attempt prior to performing facial recognition analysis on the authentication image. In a second implementation, computing device 102 may deny authentication based on a detected spoofing attempt concurrently with performing facial recognition analysis on the authentication image. In a third implementation, computing device 102 may deny authentication based on a detected spoofing attempt after performing facial recognition analysis on the authentication image. In this implementation, computing device 102 may disregard the outcome of the facial recognition analysis, and deny authentication irrespective of the results.

FIG. 1B is a conceptual diagram illustrating the behavior of computing device 102 after computing device 102 detects an attempt to cause erroneous authentication by spoofing. As discussed, an unauthorized user may attempt to spoof facial recognition programs running on computing device 102 using image 124 that represents authorized user 126. Computing device 102 may implement one or more techniques of this disclosure to detect an attempt to spoof, and deny authentication by facial recognition based on the detection. As shown in FIG. 1B, computing device 102 may display failure notification 118 within modified GUI 116. In this example, failure notification 118 merely indicates that an attempt to authenticate by facial recognition failed, and that computing device 102 has denied access to a user who attempted to unlock computing device 102 using image 124. In other examples, computing device 102 may display a more detailed notification, e.g. a notification that identifies spoofing as a reason behind the failure to authenticate.

As discussed, computing device 102 may detect an attempt to spoof in a variety of ways. For example, computing device 102 may use proximity sensor 122 to discern the physical distance between computing device 102 and the object of an authentication image. The object of an authentication image may be an actual person, or, in this example, the object is image 124 and not an actual person. When attempting to spoof the facial recognition program, an unauthorized user may in some cases place image 124 relatively close to camera lens 104. This may be because, in many instances, image 124 may be of a smaller scale than an actual human face. In order to provide a traditional facial recognition program with sufficient facial detail to authenticate, the unauthorized user may need to place image 124 in a closer proximity to camera lens 104 than authorized user 126 would do so in person. As a result, one possible symptom of an attempt to spoof may be an object of an authentication image being within a threshold proximity to camera lens 104.

Computing device 102 may determine whether the object of an authentication image is within a threshold proximity by using proximity sensor 122. As discussed, proximity sensor 122 may implement one or more sensing technologies to determine the distance between computing device 102 and the object of an authentication image captured by computing device 102. Computing device 102 may then compare the measured distance to the threshold, and deny authentication by facial recognition if the measured distance is less than the threshold. In the example of FIG. 1B, an unauthorized user may attempt to spoof the facial recognition programs running on computing device 102 by presenting image 124 as the object of an authentication image. Computing device 102 may determine that the distance between computing device 102 and image 124, as measured by proximity sensor 122, is less than the threshold, and deny authentication by facial recognition based on a suspected attempt to spoof.

In another example, computing device 102 may discern the distance between computing device 102 and image 124 by analyzing certain qualities of image 124. As shown in FIG. 1B, image 124 includes a visual representation of authorized user 126. In this example, computing device may identify two or more landmarks within image 124, and determine a number of pixels between the landmarks. For example, computing device 102 may identify a left cornea and a right cornea in image 124 as landmarks, and determine the number of pixels disposed between the left and right corneas. The higher the number of pixels, the closer that computing device 102 determines image 124 to be to computing device 102. If the number of pixels between the left and right corneas is greater than a threshold pixel count, computing device 102 may deny authentication by facial recognition and display failure notification 118.

Figure 2:
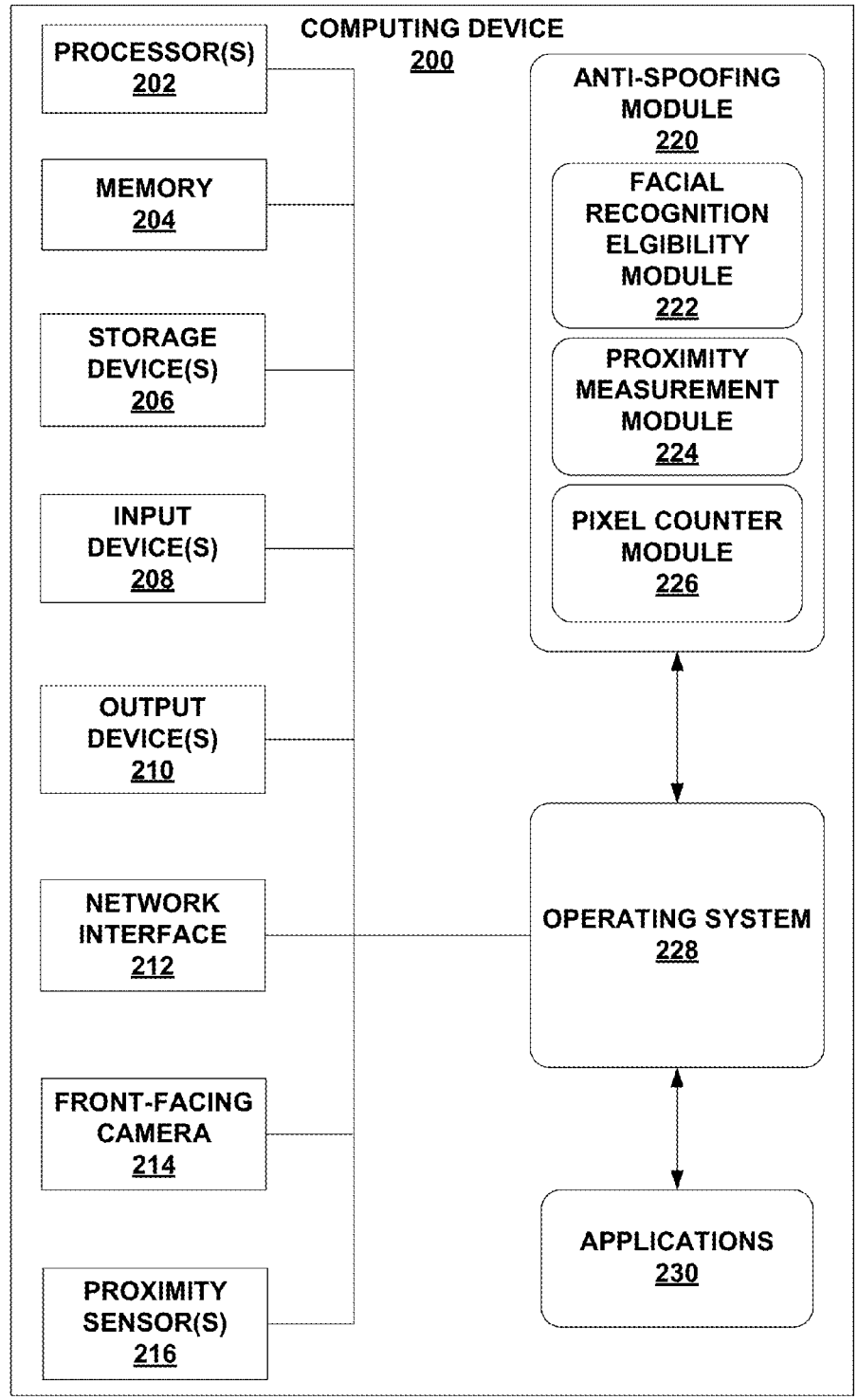
FIG. 2 is a block diagram illustrating details of an example computing device that may be used to detect possible spoofing in captured facial images, in accordance with one or more aspects of this disclosure.

FIG. 2 is a block diagram illustrating details of an example computing device for detecting possible spoofing in captured facial images, in accordance with one or more aspects of this disclosure. Computing device 200 may be one non-limiting example of computing device 102 of FIGS. 1A-1B. As shown in the example of FIG. 2, computing device 200 includes one or more processors 202, memory 204, one or more storage devices 206, one or more input devices 208, one or more output devices 210, network interface 212, front-facing camera 214, and one or more proximity sensors 216. One or more processors 202 are, in some examples, configured to implement functionality and/or process instructions for execution within computing device 200. For example, processors 202 may process instructions stored in memory 204 and/or instructions stored on storage devices 206. Such instructions may include components of operating system 228, anti-spoofing module 220, facial recognition eligibility module 222, proximity measurement module 224, pixel counter module 226, and one or more applications 230. Computing device 200 may also include one or more additional components not shown in FIG. 2, such as a power supply (e.g., a battery), a global positioning system (GPS) receiver, and a radio frequency identification (RFID) reader, among others.

Memory 204, in one example, is configured to store information within computing device 200 during operation. Memory 204, in some examples, is described as a computer-readable storage medium. In some examples, memory 204 is a temporary memory, meaning that a primary purpose of memory 204 may not be long-term storage. Memory 204, in some examples, is described as a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used to store program instructions for execution by processors 202. Memory 204, in one example, is used by software (e.g., operating system 228) or applications (e.g., one or more applications 230) executing on computing device 200 to temporarily store information during program execution.

One or more storage devices 206, in some examples, also include one or more computer-readable storage media. In some examples, storage devices 206 may be configured to store greater amounts of information than memory 204. Storage devices 206 may further be configured for long-term storage of information. In some examples, storage devices 206 include non-volatile storage elements. Examples of such non-volatile storage elements include magnetic hard discs, optical discs, solid state discs, floppy discs, flash memories, forms of electrically programmable memories (EPROM) or electrically erasable and programmable memories, and other forms of non-volatile memories known in the art.

As shown in FIG. 2, computing device 200 may also include one or more input devices 208. One or more of input devices 208 may be configured to receive input from a user through tactile, audio, video, or biometric channels. Examples of input devices 208 may include a keyboard, mouse, touchscreen, presence-sensitive display, microphone, one or more still and/or video cameras, fingerprint reader, retina scanner, or any other device capable of detecting an input from a user or other source, and relaying the input to computing device 200, or components thereof. Though shown separately in FIG. 2, one or both of front-facing camera 214 and proximity sensors 216 may, in some instances, be part of input devices 208.

Output devices 210 of computing device 200, in some examples, may be configured to provide output to a user through visual, auditory, or tactile channels. Output devices 210 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 210 may also include a touchscreen, presence-sensitive display, or other input/output-capable displays known in the art.

Computing device 200, in some examples, also includes network interface 212. Computing device 200, in one example, utilizes network interface 212 to communicate with external devices via one or more networks, such as one or more wireless networks. Network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB. In some examples, computing device 200 utilizes network interface 312 to wirelessly communicate with external devices over a network.

Operating system 228 may control one or more functionalities of computing device 200 and/or components thereof. For example, operating system 228 may interact with applications 230, and may facilitate one or more interactions between applications 230 and one or more of processors 202, memory 204, storage devices 206, input devices 208, and output devices 210. As shown in FIG. 2, operating system 228 may interact with or be otherwise coupled to applications 230 and anti-spoofing module 220 and components thereof. In some examples, one or more of anti-spoofing module 220, facial recognition eligibility module 222, proximity measurement module 224, and pixel counter module 226 may be included in operating system 228. In these and other examples, one or more of anti-spoofing module 220, facial recognition eligibility module 222, proximity measurement module 224, and pixel counter module 226 may be part of applications 230. In other examples, one or more of anti-spoofing module 220, facial recognition eligibility module 222, proximity measurement module 224, and pixel counter module 226 may be implemented externally to computing device 200, such as at a network location. In some such instances, computing device 200 may use network interface 212 to access and implement functionalities provided by anti-spoofing module 220 and its components, through methods commonly known as "cloud computing."

Anti-spoofing module 220 may implement one or more of the techniques described in this disclosure. For example, anti-spoofing module 220 may analyze an authentication image captured by front-facing camera 214 for possible spoofing, and cause operating system 228 and/or one or more of applications 230 to either grant or deny a user's request for authentication based on the analysis. In various examples, anti-spoofing module 220 may utilize one or more of facial recognition eligibility module 222, proximity measurement module 224, and pixel counter 226 to analyze the authentication image.

After computing device 200 captures an authentication image (e.g., using front-facing camera 214), anti-spoofing module 220 may begin analyzing the authentication image by determining whether the authentication image includes a representation of a human face. For example, facial recognition eligibility module 222 may implement one or more of the facial recognition techniques discussed above to detect a representation of a human face in the captured image. In various other examples, anti-spoofing module 220 may itself determine whether a captured image includes a representation of a face, or one or both of proximity measurement module 224 and pixel counter module 226 may be operable to determine whether a captured authentication image includes a representation of a face. By determining whether a captured authentication image includes a representation of a human face, anti-spoofing module 220 may eliminate those instances in which proximity measurement module 224 and/or pixel counter module 226 unnecessarily assess images that are ineligible for facial recognition.

Anti-spoofing module 220 may then analyze the captured authentication image to detect qualities that are characteristic of spoofing. For example, proximity measurement module 224 may use one or more of proximity sensors 216 to determine a distance between computing device 200 and the object of the authentication image. In one example, proximity sensors 216 includes an optical proximity sensor. In this example, proximity measurement module 224 causes the optical proximity sensor to emit and/or transmit a light beam in the direction of the object of the authentication image. The optical proximity sensor may then receive a reflection of the light beam from the object. Proximity measurement module 224 may discern and measure a phase shift between the emitted light beam and the reflection.

In the context of an optical proximity sensor, a phase shift may represent a change in phase of the light, based on the distance traveled relative to the wavelength of the light. For example, a phase shift may occur if the phase of the reflection differs from the phase of the transmitted light beam. In this example, proximity measurement module 224 may use the phase shift to derive a physical distance between computing device 200 and the object of the authentication image. In some examples, the phase shift may be directly proportional to the distance. In these examples, proximity measurement module 224 may set a minimum phase shift value for an acceptable authentication image. If the measured phase shift falls below the minimum, proximity measurement module 224 may determine that the object of the authentication is within a physical distance that is characteristic of a spoofing attempt. In this manner, proximity measurement module 224 may measure the physical distance between computing device 200 and the object of the authentication image to detect likely spoofing attempts.

In some implementations, proximity measurement module 224 may compare one or more other characteristics of the transmitted light beam and the reflection besides the phase shift. For example, proximity measurement module 224 may determine the distance between computing device 200 and the object by measuring a time flight between the transmitted light beam and the reflection. A time flight may represent the time interval from when the optical proximity sensor transmitted the light beam to when the optical proximity sensor received the reflection from the object. The time flight may be directly proportional to the distance, i.e., a longer time flight may indicate a greater physical distance between computing device 200 and the object of the authentication image. In this example, proximity measurement module may set a minimum time flight (e.g., in nanoseconds) to determine that the object is far enough from computing device 200 so that a spoofing attempt is less likely. On the other hand, if the measured time flight falls below the minimum, proximity measurement module 224 may determine that distance of the object is to the computing device is within a range characteristic of a spoofing attempt.

In some implementations, proximity measurement module 224 may define an acceptable distance range for the physical distance between the object and the computing device. Proximity measurement module 224 may define the acceptable distance range to account for situations in which an unauthorized user may also attempt to spoof the facial recognition programs by placing a large image of an authorized user (e.g. by accessing the picture using a large monitor) farther away from computing device 200. In these examples, proximity measurement module may use the minimum as a lower bound of the range, and add an upper bound. In these examples, proximity measurement module 224 may cause the facial recognition programs to deny authentication if the distance between computing device 200 and the object either 1) falls below the lower bound, or 2) exceeds the upper bound. In this manner, proximity measurement module 224 may prevent spoofing attempts that use different varieties of spoofing images.

In these and other examples, anti-spoofing module 220 may use pixel counter module 226 to detect likely spoofing attempts. Pixel counter module 226 may enable distance measurements based on characteristics of the captured authentication image, without any physical interaction with the object of the authentication image. In some examples, pixel counter module 226 may identify two or more landmarks within the captured authentication image. For example, pixel counter module 226 may identify representations of the eyes as landmarks in the captured authentication image. The front, exposed portion of the human eye is known as the cornea. For example, pixel counter module 226 may identify the left cornea and right cornea as landmarks. Pixel counter module 226 may then measure the number of pixels in the captured image between the left and right corneas. As discussed, a higher number of pixels between the left and right corneas may indicate a closer distance between computing device 200 and the object of the authentication. If the measured number of pixels exceeds a threshold, pixel counter module 226 may detect a likely spoofing attempt, and cause computing device 200 and/or components thereof to deny authentication by facial recognition.

Pixel counter module 226 may set different thresholds for different image capture devices of computing device 200, based on varying properties of the image capture devices. For example, front-facing camera 214 may be capable of capturing images of a higher resolution than a rear-facing camera of input devices 208. In this case, pixel counter module 226 may set a higher pixel threshold for authentication images captured by front-facing camera 214 than for authentication images captured by the rear-facing camera of input devices 208. In this manner, pixel counter module 226 may detect likely spoofing attempts by measuring the number of pixels between facial landmarks in the captured authentication image.

Figure 3:
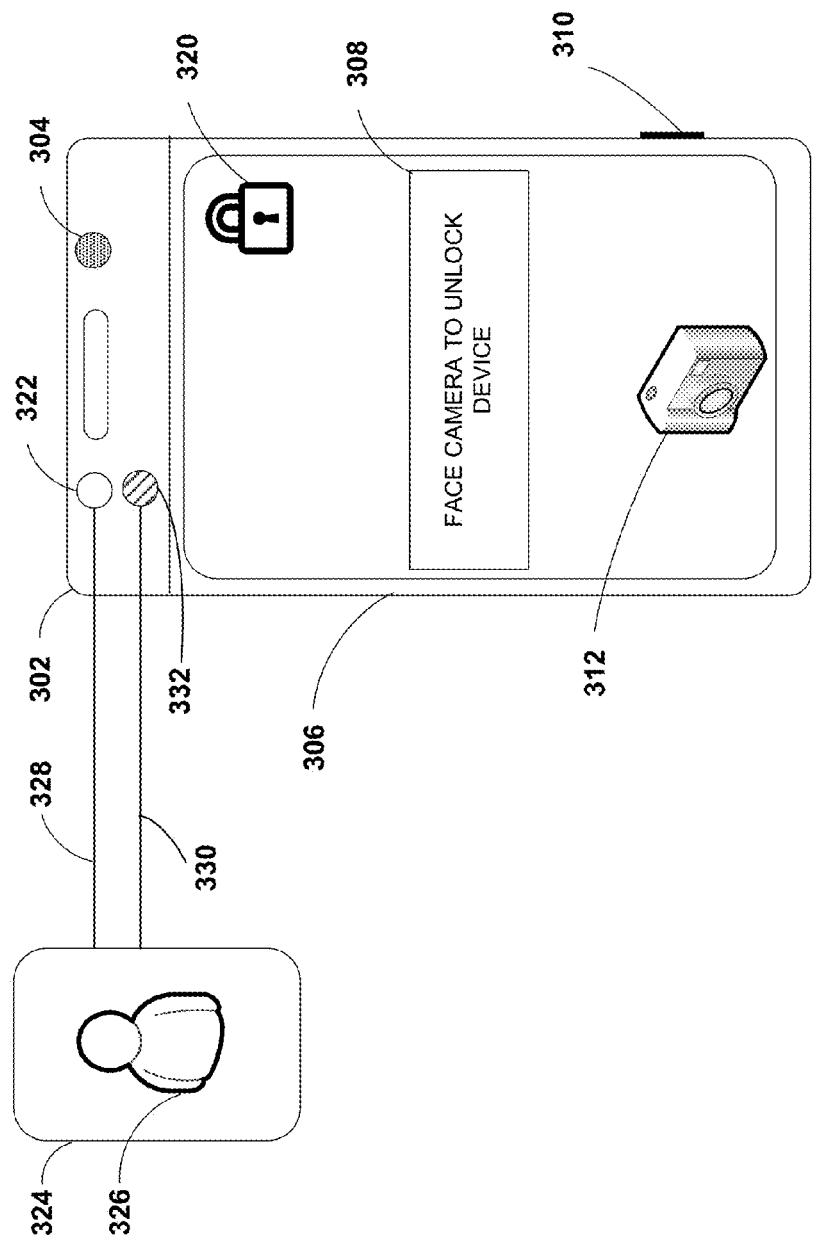
FIG. 3 is a conceptual diagram illustrating details of an example computing device that detects possible spoofing in a captured facial image by measuring distances between the computing device and an object of a captured facial image, in accordance with one or more aspects of this disclosure.

FIG. 3 is a conceptual diagram illustrating details of an example computing device that detects possible spoofing in a captured facial image by measuring distances between the computing device and an object of a captured facial image, in accordance with one or more aspects of this disclosure. Computing device 302 may also be equipped to detect its proximity to image 324 through multiple channels. Additionally, computing device 302 may compare multiple proximity readings and calculate an acceptable margin of error for future proximity measurements while implementing the anti-spoofing techniques of this disclosure.

In the example of FIG. 3, computing device 302 may include camera lens 304. Camera lens 304 may be part of or coupled to a front-facing camera of computing device 302. In other examples, camera lens 304 may be part of or coupled to a rear-facing camera of computing device 102. One or both of the front-facing and rear-facing cameras may be capable of capturing still images, video, or both.

Additionally, computing device 302 may include multiple proximity sensors. In the example of FIG. 3, computing device 302 may include optical proximity sensor 322 and infrared proximity sensor 332. In other examples, computing device 302 may include one or more types of proximity sensors listed above, and may include more than two proximity sensors. One or both of optical proximity sensor 322 and infrared proximity sensor 332 may enable computing device 302 to calculate a distance between computing device 302 and image 324 at a given time. In various examples, one or both of optical proximity sensor 322 and infrared proximity sensor 332 may utilize a physical property known as "reflectance" or "reflectivity" to calculate a distance between computing device 302 and image 324. For example, optical proximity sensor 322 may emit a light beam towards image 324, and receive a reflection associated with the light beam from image 324. Optical proximity sensor 322 may then derive a ratio between the known electromagnetic power of the light beam and the measured electromagnetic power of the received reflection. Based on the ratio (or a resulting fraction), optical proximity sensor 322 may determine the physical distance between computing device 302 and image 324.

Similar to the example of FIG. 1, computing device 302 may enable authorized user 326 to gain access using facial recognition technology to one or more functionalities controlled by computing device 302. For example, computing device 302 may capture an enrollment image that, at least in part, represents the face of authorized user 326. When a user subsequently attempts to gain access to functionalities controlled by computing device 302, computing device 302 may then prompt the user (e.g., using unlock prompt 308), to provide an authentication image. Computing device 302 may capture the authentication image (e.g., using camera lens 304), and compare the authentication image to the enrollment image based on various attributes and metrics. If the facial recognition programs running on computing device 302 detect sufficient similarity between the authentication image and the enrollment image (a "match"), computing device 302 may authenticate the user and grant access to one or more of functionalities controlled by computing device 302.

Concurrently with, before, or after capturing an enrollment image (e.g., of authorized user 326), computing device 302 may use optical proximity sensor 322 to calculate a first proximity reading between computing device 302 and authorized user 326. The value of the first proximity reading may serve as an estimated distance 328 in this example. Computing device 302 may also use infrared proximity sensor 332 to measure a second proximity reading between computing device 302 and image 324. The value of the second proximity reading may serve as measured distance 330.

As discussed, an unauthorized user may attempt to exploit vulnerabilities of conventional facial recognition programs, causing erroneous authentication by spoofing. In the example of FIG. 3, an unauthorized user may attempt to unlock computing device 302 by presenting image 324 when prompted by computing device 302 to submit an authentication image. In turn, in accordance with the techniques of this disclosure, computing device 302 may use estimated distance 328 and measured distance 330 to detect the spoofing attempt and to deny authentication by facial recognition.

Based on estimated distance 328 and measured distance 330, computing device 302 may then generate an acceptable margin of error for the distance between computing 302 and the object of an authentication image (in this case, image 324). To generate the acceptable margin of error, computing device 302 may calculate a ratio between the measured distance 330 and estimated distance 328. Computing device 302 may then apply the ratio to the proximity measurements of subsequent authentication images. If computing device 302 determines that a subsequent proximity measurement is closer than the threshold distance, but finds a ratio between the proximity measurement and the threshold is within the acceptable margin of error, computing device 302 may determine that the authentication attempt is legitimate and not an attempt to spoof, and will proceed with authentication of the user, transitioning computing device 302 into an unlocked state.

In some examples, computing device 302 may use infrared proximity sensor 332 to measure estimated distance 328 and optical proximity sensor 322 for measured distance 330. In various examples, computing device 302 may calculate estimated distance 328 and measure measured distance 330 at the same or different times. In these and other examples, computing device 302 may capture the authentication image at the same time or at a different time from calculating and/or measuring one or both of estimated distance 328 and measured distance 330.

In some examples, computing device 302 may also store other information about the user's face during the setup of the facial recognition algorithm (e.g., reflectance, distance detected by a different type of method, or other information), and may generate a correction factor based on the information obtained. Computing device 302 could then compute and apply a correction factor to a detected distance when the user is attempting to unlock the phone. This may enable more precise tuning and better resistance to attacks for an approach that uses precise measurements, as the error margin could be tightened.

For example, in some implementations, computing device 302 may use as a correction factor a calculated ratio between a measured distance 330 obtained by a first method (e.g., optical proximity sensor 322) and a second distance calculated based on a second method, such as a feature-based method, e.g., a method that computes a distance based on a number of pixels observed between facial landmarks. For example, computing device 302 may recognize estimated distance 328 to be an actual distance between computing device 302 and authorized user 326, and may determine that a calculated feature-based distance is different than estimated distance 328, by a margin corresponding to the correction factor. Computing device 302 can compute the correction factor based on a ratio of the two distances, and may store the correction factor. Such differences may be caused by variations and idiosyncrasies associated with a human face (e.g., the face of authorized user 326) and/or differences in the methods of distance calculation. In these implementations, computing device 302 may then apply the correction factor to future distances measured with respect to authentication images. For example, during a subsequent authentication attempt, computing device 302 may measure the distance between computing device 302 and image 324 using optical proximity sensor 322, and then divide the measured distance by the correction factor to calculate an "expected distance" to be detected by the second method for a legitimate authentication image. Computing device 302 can then compute the distance between computing device 302 and image 324 using the second method (e.g., pixel-counting), and compare the measured distance to the expected distance that was obtained using the correction factor. In a spoofing situation, it may be difficult to obtain a spoofing image that provided two measured distances that were individually accurate and consistent with the stored correction factor. In still other implementations, computing device 302 may obtain one or both of estimated distance 328 and measured distance 330 by other methods, such as an infrared proximity sensor or other method.

In one example, computing device 302 may apply the correction factor to check for expected distances. For example, with respect to an enrollment image, if measured distance 330 is 55 centimeters, and feature-based distance is 50 centimeters, computing device 302 may derive a correction factor of 1.1. Computing device 302 may then divide, by a divisor of 1.1, future measured distances associated with authentication images. In one example, a user may later try to log in from a distance of 84 centimeters. Computing device 302 detects a proximity sensor distance of 84 centimeters and divides this by the correction factor and expects to get a feature-based distance of 76 centimeters. If the feature-based distance is within a margin of error of 76 centimeters, computing device 302 allows the user to proceed to facial recognition. In another example, an unauthorized user may place image 324 such that computing device 302 detects a feature-based distance of 55 centimeters. Additionally, in this example, the image 324 may be of substantially the same size as the face of authorized user 326. In this example, computing device may divide the detected feature-based distance (55 cm) by the correction factor of 1.1, obtaining an expected proximity sensor distance of approximately 50 centimeters. If instead the image 324 is sensed by proximity sensor as being 55 cm detected distance does not match the expected distance associated with authorized user 326 (50 cm), computing device 302 may detect a spoofing attempt, and deny authentication independent of performing facial recognition analysis.

In other examples, other information such as reflectance may be obtained or otherwise determined during the enrollment process. Different materials (and even different faces) reflect differently, so the correction factor approach may be used to verify that the determined reflectance matches up with the distance computed based on their facial features. For example, a paper photograph of a user will have a different reflectance value than an actual face of a user. This would enable computing device 302 to more precisely tune to individual users, making spoofing more difficult.

In some implementations, techniques of this disclosure may enable computing device 302 to use the two-dimensional (2-D) nature of several images (such as image 324) to detect a spoofing attempt. For example, computing device 302 may identify a spoofing attempt if estimated distance 328 and measured distance 330 are not sufficiently different from one another. In the case of a legitimate enrollment image, estimated distance 328 and measured distance 330 may vary due to various factors, such as the contours of the human face, etc. If estimated distance 328 and measured distance 330 are not sufficiently different from each other, computing device 302 may detect that image 324 is two-dimensional, and does not display sufficient three-dimensional qualities to be a legitimate facial image. Based on the detection, computing device 302 may deny authentication independent of performing facial recognition analysis. In this manner, techniques of this disclosure may enable a computing device to use the 2-D nature common to spoof-based images to prevent erroneous authentication caused by spoofing.

Figure 4:
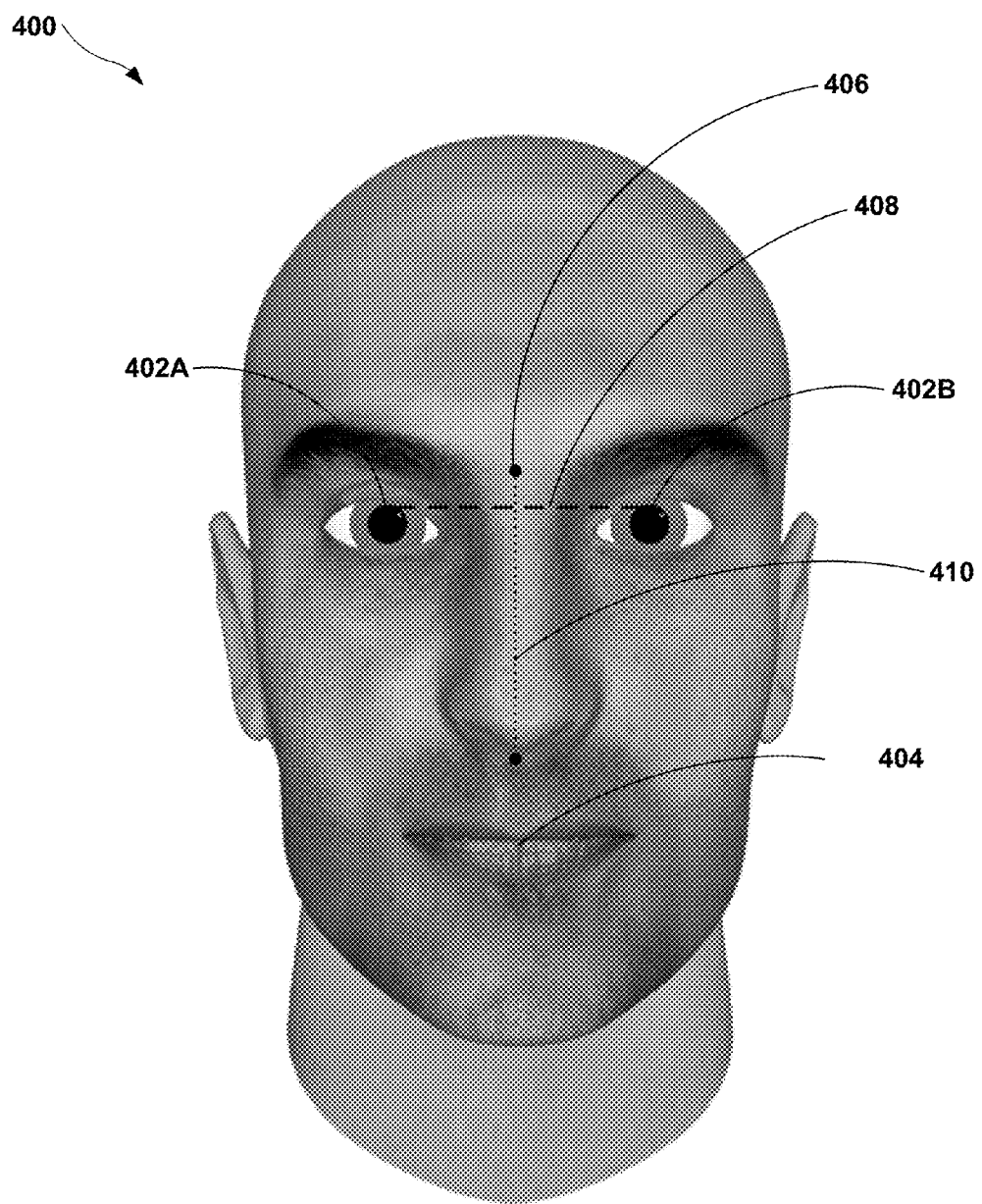
FIG. 4 is a conceptual diagram illustrating an example facial image that includes landmarks identified by a computing device to detect possible spoofing in the facial image, in accordance with one or more aspects of this disclosure.

FIG. 4 is a conceptual diagram illustrating an example facial image that includes landmarks identified by a computing device to detect possible spoofing in the facial image, in accordance with one or more aspects of this disclosure. As shown in FIG. 4, facial image 400 includes a representation of a human face. Facial image 400 may be an example of an authentication image or enrollment image, as the case may be. As discussed, a computing device may implement techniques of this disclosure to detect a possible spoofing attempt by identifying multiple landmarks in a facial image, and then determining a number of pixels between the landmarks.

Facial image 400 includes identified landmarks such as right cornea 402A, left cornea 402B, ocular center 406, and nasal base 404. The landmarks illustrated in FIG. 4 are just a few non-limiting examples of possible facial landmarks that may be used under the techniques of this disclosure. A computing device may implement the techniques to identify various other landmarks, which are not called out in FIG. 4 for ease of illustration purposes. By identifying multiple landmarks and the pixel counts between various combinations of the landmarks, a computing device may obtain multiple pixel counts for a more robust determination of the distance from the computing device to the object of the facial image. In some instances, as discussed with respect to FIG. 3, the computing device may use multiple pixel counts to generate a reference pixel count and/or an acceptable margin of error for future pixel counts.

In the example of FIG. 4, a computing device may determine the physical distance between the computing device and the object of facial image 400 by measuring intercorneal distance 408. As discussed, the computing device may express intercorneal distance 408 in terms of a number of pixels. In the specific example of FIG. 4, the computing device may construe intercorneal distance 408 to be the number of pixels between the respective pupils (i.e., central portion) of right cornea 402A and left cornea 402B (hereinafter "corneas 402"). In other examples, the computing device may construe intercorneal distance to be the number of pixels between the respective irises (colored portion surrounding the pupil) of corneas 402. In still other examples, the computing device may construe intercorneal distance to be the number of pixels between the respective scleras (white portion) of corneas 402. In this manner, techniques of this disclosure may enable a computing device to exercise several different options to measure intercorneal distance 408.

As discussed, the computing device may utilize intercorneal distance 408 to determine, or estimate, the physical distance between the computing device and the object of facial image 400. In many cases, the greater that intercorneal distance 408 is (i.e., the greater the number of pixels detected between corneas 402), the closer the computing device may be physically to the object of facial image 400. The reason for this inverse proportionality is that, in many cases, an unauthorized user who tries to authenticate by spoofing may have access to an image that is considerably proportionally smaller in dimension than a human face. As a result, the unauthorized user may need to place the spoofing image relatively close to the computing device (or a camera lens thereof) to provide the facial recognition programs with sufficient detail to authenticate, and in an attempt to present approximate expected proportions for a face to the computing device.

To prevent such an attempt to authenticate by spoofing, a computing device in accordance with this disclosure may set a threshold pixel count for space between the eyes of an authentication image. If intercorneal distance 408 exceeds the threshold pixel count, the computing device may identify a possible spoofing attempt, and deny authentication prior to performing facial recognition. In some examples, the computing device may set different threshold pixel counts for intercorneal distance 408. For example, the computing device may be equipped with multiple image capture devices, such as a front-facing and a rear-facing camera. The cameras may have different image capture capabilities, such as image resolution. In this example, the computing device may set different threshold pixel counts for the cameras, weighted by the cameras' image resolution capabilities.

In this and other examples, a computing device may implement the techniques of this disclosure by measuring central vertical distance 410. As with intercorneal distance 408, central vertical distance 410 may be expressed as a number of pixels. As shown in FIG. 4, central vertical distance 410 may represent the linear separation between ocular center 406 and nasal base 404. In this example, ocular center 406 is identified as the central point between the eyebrows of facial image 400. In other examples, ocular center 406 may be the center point between corneas 402. Similarly, central vertical distance 410 may, in other examples, be the linear separation between ocular center 406 and a point other than nasal base 404, such as a lip center or a chin center.

A computing device may utilize central vertical distance to determine or estimate the physical distance between the computing device and the object of facial image 400. As with the case of intercorneal distance 408, the computing device may set a threshold pixel count for central vertical distance 410. If central vertical distance exceeds the threshold pixel count, the computing device may identify a possible spoofing attempt, and deny authentication of the user prior to performing facial recognition. In various examples, the computing device may utilize central vertical distance 410 as a backup option to intercorneal distance 408, and vice versa. For example, when intercorneal distance 408 falls within its corresponding threshold pixel count, the computing device may still deny authentication if central vertical distance 410 exceeds its corresponding threshold pixel count. In a converse example, when intercorneal distance 408 exceeds a corresponding threshold pixel count, the computing device may yet grant authentication if central vertical distance 410 falls within its corresponding threshold pixel count. In this manner, a computing device may implement the techniques of this disclosure to make more robust estimations of the physical distance between the computing device and an object of a captured facial image.

Figure 5:
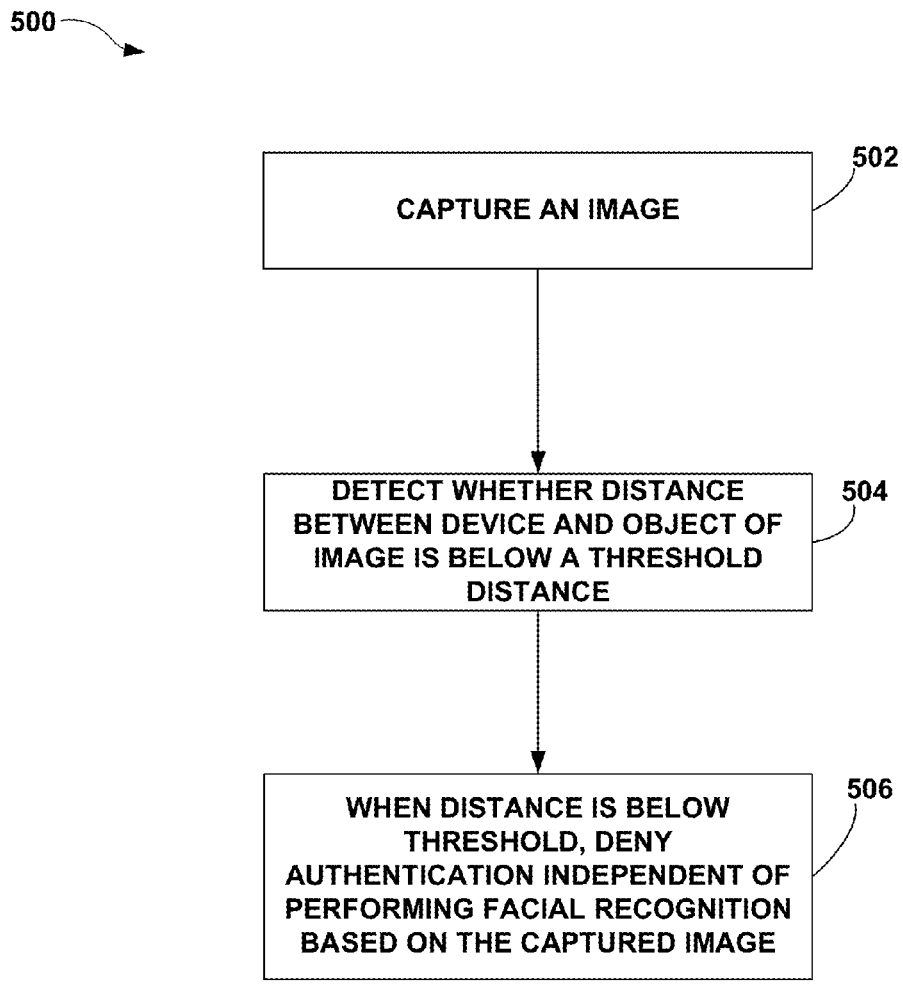
FIG. 5 is a flowchart illustrating an example process that may be performed by a computing device to detect possible spoofing in a captured facial image, in accordance with one or more aspects of this disclosure.

FIG. 5 is a flowchart illustrating an example process that may be performed by a computing device to detect possible spoofing in a captured facial image, in accordance with one or more aspects of this disclosure. While process 500 may be performed by any computing device described herein, for ease of illustration purposes only, process 500 will be discussed with respect to computing device 200 shown in FIG. 2. Process 500 may begin when computing device 200 captures an image (502). In many instances, computing device 200 may use an image capture device, such as front-facing camera 214. Though the captured image may serve several purposes, for ease of illustration purposes only, process 500 will be described with respect to a facial image, and more specifically, an authentication image.

Computing device 200 may then measure the distance between computing device 200 and the object of the authentication image (504). In examples, computing device 200 may use anti-spoofing module 220, and one or more components thereof, to measure the distance. For example, proximity measurement module 224 may measure the distance using an optical proximity sensor of input devices 208. In this and other examples, pixel counter module 226 may determine or estimate the distance based on a number of pixels disposed between two or more landmarks identified in the authentication image.

As discussed, a closer distance between computing device 200 and the object of the authentication image may be indicative of a spoofing attempt. Based on this tendency, when the measured distance is below a threshold distance, anti-spoofing module 220 may deny authentication of the user prior to performing facial recognition on the captured image (506). In some examples, anti-spoofing module 220 may cause one or more facial recognition programs executing as part of operating system 228 and/or applications 230 to deny authentication prior to performing facial recognition if the measured distance is below the threshold. In this manner, computing device 200 may implement process 500 to prevent erroneous authentication caused by spoofing.

Figure 6:
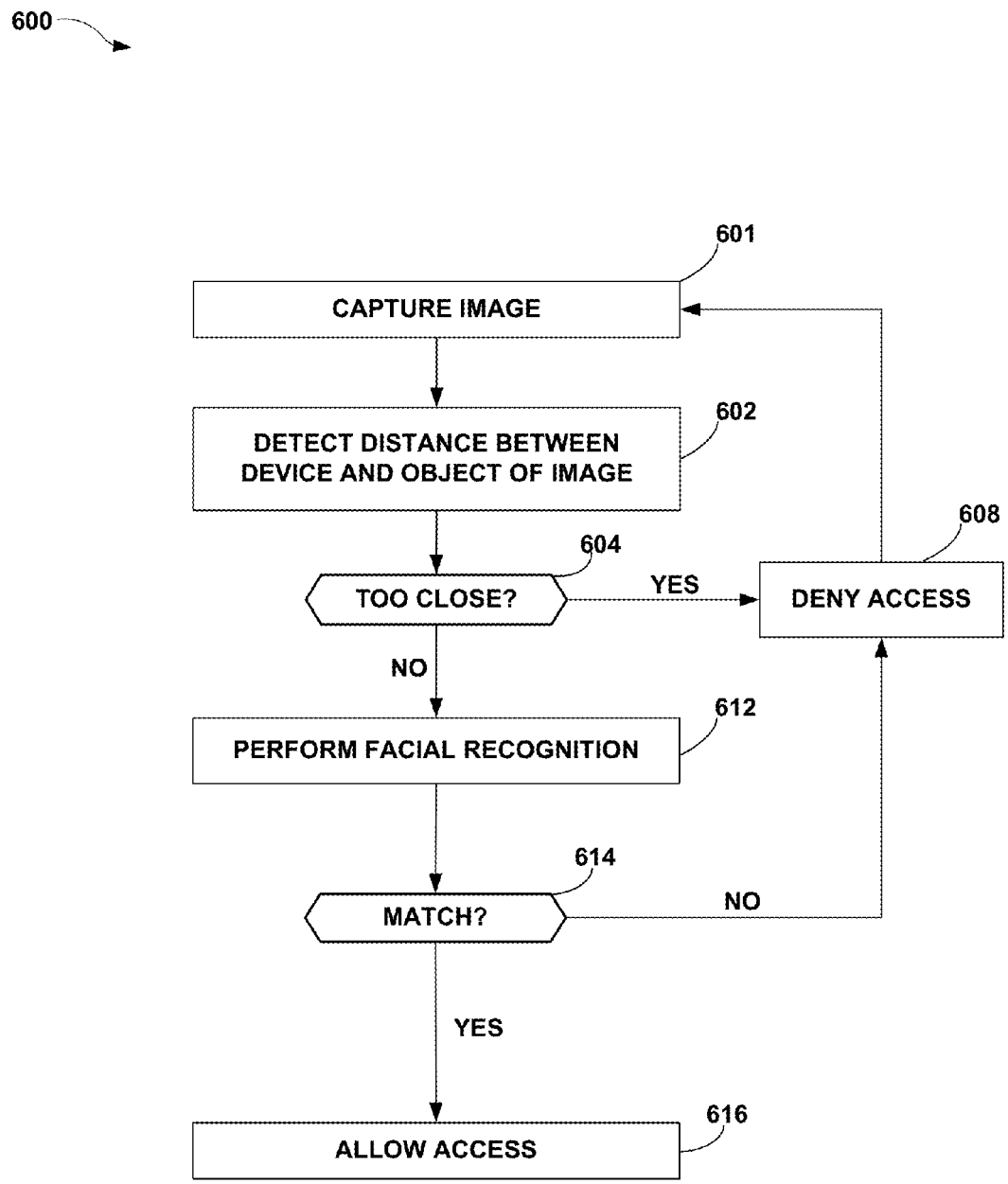
FIG. 6 is a flowchart illustrating an example process that may be performed by a computing device to detect spoofing in a captured facial image, in accordance with one or more aspects of this disclosure.

FIG. 6 is a flowchart illustrating an example process that may be performed by a computing device to detect spoofing in a captured facial image, in accordance with one or more aspects of this disclosure. Process 600 may be one of several implementations possible in accordance with the techniques of this disclosure. While process 600 may be performed by any computing device described herein, for ease of illustration purposes only, process 600 will be discussed with respect to computing device 200 shown in FIG. 2. Computing device 200 may implement process 600 to implement the techniques of this disclosure in a "binary" fashion. More specifically, process 600 may enable computing device 200 to determine whether or not the object of the captured image is within the threshold distance, without measuring the exact distance to the object. Process 600 may begin when computing device 200 captures an image (601). In many instances, computing device 200 may use an image capture device, such as front-facing camera 214. Though the captured image may serve several purposes, process 600 will be described with respect to a facial image, and more specifically, an authentication image.

Computing device 200 may then detect the physical distance between computing device 200 and the object of the authentication image (602). As discussed, computing device 200 may detect the distance using several different methods, including one or more of measurements by proximity measurement module 224 and input devices 208, and pixel-based estimations by pixel counter module 226, or other methods. Anti-spoofing module 220 may then determine whether the distance is too close, such as by comparing the measured/estimated distance with a threshold value (604). Based on the outcome of the determination, computing device 200 may implement various steps. For example, if anti-spoofing module may cause computing device 200 and/or components thereof to deny access based on facial recognition authentication (608). If anti-spoofing module 220 determines that the distance equals or exceeds the threshold, anti-spoofing module 220 may permit computing device 200 and/or components thereof to perform facial recognition, such as by performing a facial recognition authentication operation (612).

Computing device 200 may perform facial recognition in a variety of manners. For example, computing device 200 may analyze the authentication image using one or more facial recognition programs executing as part of operating system 228 and/or applications 230. Employing various metrics, characteristics, and other criteria, the facial recognition programs may determine whether or not the authentication image sufficiently matches at least one enrollment image (614). If the facial recognition programs do not grant a match to the authentication image ('NO' branch of 614), the facial recognition programs may deny access by facial recognition authentication (608). At this point, the facial recognition programs may permit the user to try again to authenticate by facial recognition, sometimes by capturing another authentication image (601).

If the facial recognition programs grant a match to the authentication image ('YES' branch of 614), the facial recognition programs may allow the user access to one or more functionalities controlled by computing device 200 (616). In some instances, such functionalities may be implemented by computing device 200 and components thereof, such as operating system 228 and/or applications 230. For example, if the facial recognition programs grant a match to the authentication image, one or more components of operating system 228 may transition computing device 200 from a locked state into an unlocked state. In other examples, computing device 200 may control access to functionalities of another device, such as a door lock. In these examples, the facial recognition programs may cause the door lock to transition from locked to unlocked state, sometimes communicating the facial recognition match using network interface 212. Such door locks may be used in various scenarios, such as to control access to safeboxes containing valuable data and documents, bank vaults, building access, automobile doors, or storage areas used for controlled substances (e.g., cabinets in a medical facility), and other scenarios in which access to resources is protected by facial recognition systems. In other examples, the facial recognition programs may be implemented on devices that provide access to remote content, such as a television set-top box (to limit access to various broadcast content) or a desktop computer (e.g., to limit access to various internet-based content or sensitive information stored on the desktop computer). In this manner, computing device 200 may implement process 600 to grant or deny access in several different scenarios.

Figure 7:
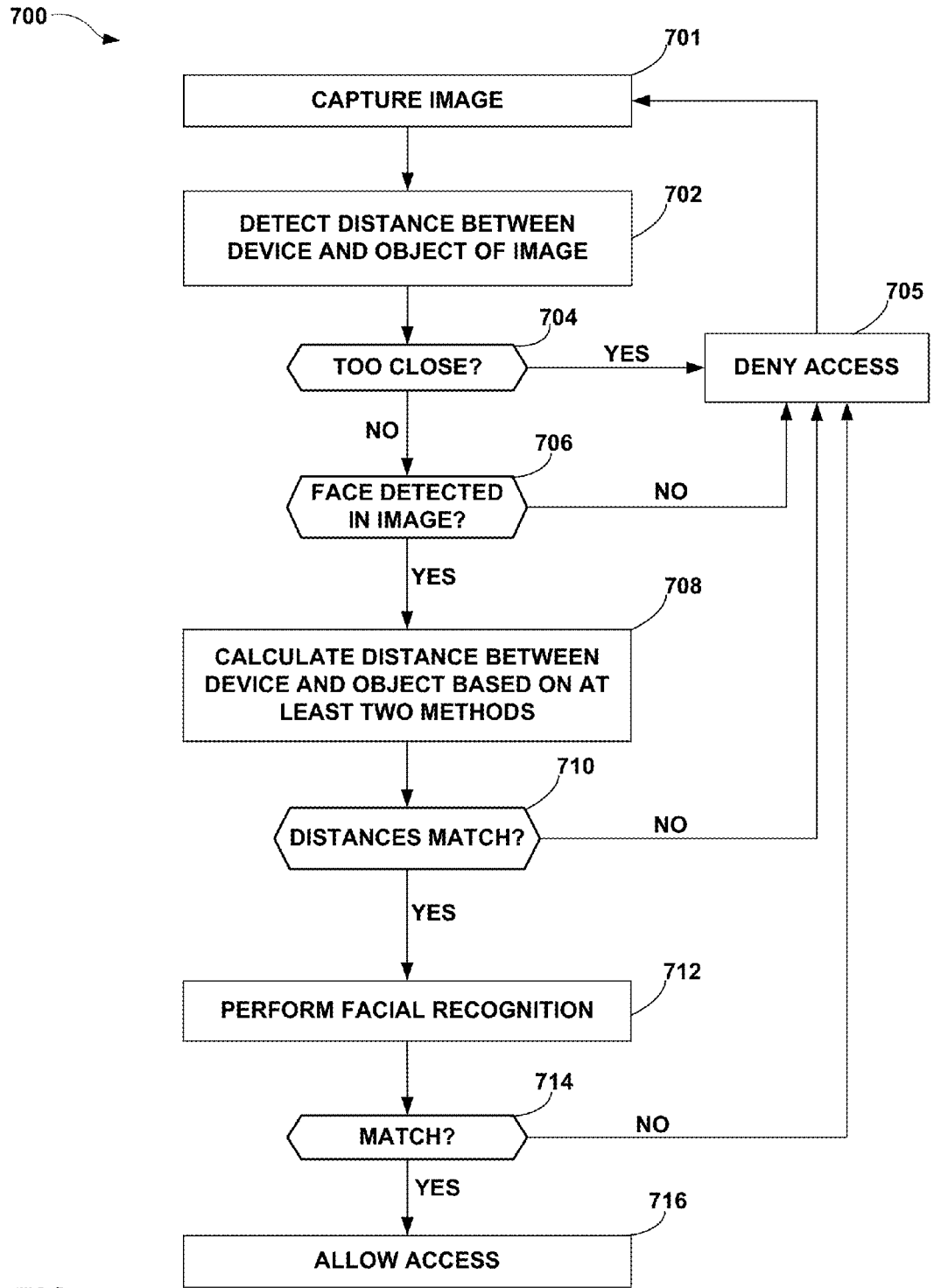
FIG. 7 is a flowchart illustrating an example process that may be performed by a computing device to detect spoofing in a captured facial image, in accordance with one or more aspects of this disclosure.

FIG. 7 is a flowchart illustrating an example process that may be performed by a computing device to detect spoofing in a captured facial image, in accordance with one or more aspects of this disclosure. Process 700 may be an alternative, or enhanced version, of process 600 described with respect to FIG. 6. While process 700 may be performed by any computing device described herein, for ease of illustration purposes only, process 700 will be discussed with respect to computing device 302 shown in FIG. 3. Process 700 may begin when computing device 302 captures an image (701). In many instances, computing device 302 may use an image capture device, such as a front-facing camera that includes or is coupled to camera lens 304. Though the captured image may serve several purposes, process 700 will be described with respect to a facial image, and more specifically, an authentication image.

Computing device 302 may then detect the distance between itself and the object of the authentication image (702). In this example, the object of the authentication image is image 324. Computing device 302 may measure the distance in one of several ways, including by use of optical proximity sensor 322 to measure estimated distance 328. Computing device 302 may then determine whether estimated distance 328 is too close, i.e. whether the measured distance is below a threshold value (704). If computing device 302 determines that estimated distance 328 is below the threshold, computing device 302 may deny access by facial recognition authentication (705).

If estimated distance 328 equals or exceeds the threshold value, computing device 302 may then detect whether or not the authentication image includes a representation of a human face (706). If computing device 302 determines that the authentication image does not include a representation of a human face, computing device 302 may deem the authentication image ineligible for authentication by facial recognition, and deny access to computing device 302 based on the authentication image (705). If computing device 302 detects a representation of a human face in the authentication image, computing device 302 may calculate the distance between itself and image 324 based on at least two methods (708). In one example, computing device 302 may supplement estimated distance 328 with measured distance 330, which computing device 302 may detect using infrared proximity sensor 332.

Computing device 302 may then determine whether measured distance 330 and estimated distance 328 are sufficiently close to constitute a match (708). In some instances, computing devices 302 may grant a match only if measured distance 330 and estimated distance 328 are identical. In other examples, computing device 302 may grant a match if measured distance 330 and estimated distance 328 differ by an amount that falls within a preprogrammed margin of error. In this manner, computing device 302 may implement process 700 to improve and make more robust some of the techniques discussed earlier, such as process 600 of FIG. 6.

If computing device 302 does not grant a match based on comparing measured distance 330 and estimated distance 328, computing device 302 may deny access by facial recognition authentication (705). If computing device 302 grants a match based on comparing measured distance 330 and estimated distance 328, computing device 302 may perform facial recognition by comparing the authentication image to one or more enrollment images (712). Based on whether facial recognition programs executing on computing device 302 grant a match (714), computing device 302 may either deny access (705) or allow access (716) based on facial recognition authentication.

While described with respect to computing devices that use facial recognition technologies, techniques of this disclosure may be implemented by computing devices that use other types of biometric authentication as well. For example, the techniques may be implemented by computing devices that use other types of recognition-based technologies (e.g., technologies for recognizing a user's body characteristics of, etc.), touch-free fingerprint recognition, and others.

Example 1A

A method comprising: capturing, by an image capture device coupled to a computing device, an image of a face of a user; detecting, by the computing device, whether a distance between the image capture device and an object represented by at least a portion of the image is less than a threshold distance; and when the detected distance is less than the threshold distance, denying authentication of the user with respect to accessing one or more functionalities controlled by the computing device, wherein the authentication is denied independent of performing facial recognition based at least in part on the captured image.

Example 2A

The method of example 1A, wherein detecting whether the distance is less than the threshold distance further comprises: identifying at least two landmarks within the image; determining a number of pixels of the image disposed between the at least two landmarks of a face represented in the image.

Example 3A

The method of example 2A, wherein the at least two landmarks include a left cornea and a right cornea of a face represented in the image.

Example 4A

The method of example 2A, wherein the at least two landmarks include an ocular center and a nasal base of a face represented in the image.

Example 5A

The method of example 1A, wherein detecting whether the distance between the computing device and the object represented by at least a portion of the image is less than the threshold distance further comprises measuring the distance between the computing device and the object, and wherein measuring the distance further comprises: transmitting a light beam towards the object; receiving a reflection associated with the transmitted light beam; and determining the distance based at least in part on the received reflection.

Example 6A

The method of example 5A, wherein determining the distance based at least in part on the received reflection further comprises: measuring a phase shift associated with the received reflection.

Example 7A

The method of example 5A, wherein determining the distance based at least in part on the received reflection further comprises measuring a time of flight associated with the transmitted light beam and the received reflection.

Example 8A

The method of example 5A, further comprising: determining a reflectance associated with the transmitted light beam; and determining the distance based at least in part on the determined reflectance.

Example 9A

The method of example 1A, further comprising: estimating a distance between the computing device and the object represented by at least the portion of the image to obtain an estimated distance; calculating a ratio between the detected distance and the estimated distance; generating an acceptable margin of error based at least in part on the calculated ratio; when the detected distance is within the margin of error from the estimated distance, processing the image to determine whether the image matches at least one of (1) an enrollment image that represents, at least in part, a face of an authorized user, and (2) a mathematical representation of the face of the authorized user.

Example 10A

The method of example 9A, further comprising: upon determining that the image matches the enrollment image, granting authentication of the user.

Example 11A

The method of example 1A, further comprising: upon denying authentication of the user, preventing the computing device from transitioning from a locked state to an unlocked state.

Example 12A

The method of example 1A, further comprising: upon denying authentication by facial recognition, denying a device communicatively coupled to the computing device permission to transition from a locked state to an unlocked state.

Example 13A

The method of example 12A, wherein the device communicatively coupled to the computing device is a door lock.

Example 14A

The method of example 1A, further comprising: defining an acceptable distance range having a lower bound and an upper bound, wherein the lower bound corresponds to the threshold distance; and when the detected distance is less than the lower bound or greater than the upper bound, denying authentication of the user with respect to accessing one or more functionalities controlled by the computing device, wherein the authentication is denied independent of performing facial recognition based at least in part on the captured image.

Example 15A

The method of example 1A, wherein detecting whether the distance between the computing device and the object is below the threshold distance further comprises measuring the distance by at least one of an optical proximity sensor, infrared proximity sensor, laser rangefinder, magnetic sensor, and sonar sensor.

Example 16A

The method of example 1A, further comprising: when the distance is equal to or greater than the threshold distance, proceeding to perform a facial recognition authentication operation using the captured image.

Example 17A

The method of example 1A, further comprising: outputting, by a display device of the computing device, a notification that indicates the denying of authentication of the user with respect to accessing one or more functionalities controlled by the computing device, wherein the authentication is denied independent of performing facial recognition based at least in part on the captured image.

Example 18A

The method of example 1A, wherein denying authentication further comprises denying authentication of the user prior to performing facial recognition based at least in part on the captured image.

Example 19A

The method of example 1A, wherein denying authentication further comprises denying authentication of the user concurrently with performing facial recognition based at least in part on the captured image.

Example 20A

The method of example 1A, wherein denying authentication of the user further comprises denying authentication of the user after performing facial recognition based at least in part on the captured image and irrespective of one or more results of performing the facial recognition.

Example 21A

A computer-readable storage device comprising instructions for causing at least one processor of a computing device to perform operations comprising: capturing, by an image capture device coupled to the computing device, an image of a face of a user; detecting whether a distance between the computing device and an object represented by at least a portion of the image is less than a threshold distance; and when the detected distance is less than a threshold distance, denying authentication of the user with respect to accessing one or more functionalities controlled by the computing device, independent of performing facial recognition based at least in part on the captured image.

Example 22A

A computing device comprising: at least one processor; and at least one image capture device, wherein the at least one image capture device is operable to capture an image of a face of a user, and wherein the at least one processor is configured to: detect whether a distance between the computing device and an object represented by at least a portion of the image is less than a threshold distance; and when the detected distance is less than a threshold distance, deny authentication of the user with respect to accessing one or more functionalities controlled by the computing device, independent of performing facial recognition based at least in part on the captured image.

Example 23A

A method comprising: capturing, by an image capture device coupled to a computing device, an enrollment image associated with an authorized user of the computing device; detecting, by the computing device, an estimated distance between the computing device and an object represented by at least a portion of the enrollment image; measuring, by the computing device, a first measured distance between the computing device and the object represented by at least the portion of the enrollment image; generating, by the computing device, a correction factor at least in part by dividing the first measured distance by the estimated distance; capturing, by the image capture device of the computing device, an authentication image; measuring, by the computing device, a second measured distance between the computing device and an object represented by at least a portion of the authentication image; dividing the second measured distance by the correction factor to obtain an expected actual distance; detecting an actual distance; determining whether the actual distance matches the expected actual distance; and when the actual distance does not match the expected actual distance, denying authentication to a user with respect to accessing one or more functionalities controlled by the computing device, wherein the authentication is denied independent of performing facial recognition based at least in part on the authentication image and the enrollment image.

Example 1B

A computer-readable storage device comprising instructions for causing at least one processor of a computing device to perform operations comprising: capturing, by an image capture device coupled to the computing device, an image of a face of a user; detecting whether a distance between the computing device and an object represented by at least a portion of the image is less than a threshold distance; and when the detected distance is less than a threshold distance, denying authentication of the user with respect to accessing one or more functionalities controlled by the computing device.

Example 2B

The computer-readable storage device of example 1B, wherein the instructions for causing the at least one processor to detect whether the distance is less than the threshold distance comprise instructions for causing the at least one processor to perform operations comprising: identifying at least two landmarks within the image; and determining a number of pixels of the image disposed between the at least two landmarks of a face represented in the image.

Example 3B

The computer-readable storage device of example 2B, wherein the at least two landmarks include a left cornea and a right cornea of a face represented in the image.

Example 4B

The computer-readable storage device of example 2B, wherein the at least two landmarks include an ocular center and a nasal base of a face represented in the image.

Example 5B

The computer-readable storage device of example 1B, wherein the instructions for causing the at least one processor to detect whether the distance is less than the threshold distance comprise instructions for causing the at least one processor to perform operations comprising: transmitting a light beam towards the object; receiving a reflection associated with the transmitted light beam; and determining the distance based at least in part on the received reflection.

Example 6B

The computer-readable storage device of example 5B, wherein the instructions for causing the at least one processor to determine the distance based at least in part on the received reflection comprise instructions for causing the at least one processor to perform operations comprising: measuring a phase shift associated with the received reflection.

Example 7B

The computer-readable storage device of example 5B, wherein the instructions for causing the at least one processor to determine the distance based at least in part on the received reflection comprise instructions for causing the at least one processor to perform operations comprising: measuring a time of flight associated with the transmitted light beam and the received reflection.

Example 8B

The computer-readable storage device of example 5B, further comprising instructions for causing the at least one processor to perform operations comprising: determining a reflectance associated with the transmitted light beam; and determining the distance based at least in part on the determined reflectance.

Example 9B

The computer-readable storage device of example 1 B, further comprising instructions for causing the at least one processor to perform operations comprising: estimating a distance between the computing device and the object represented by at least the portion of the image to obtain an estimated distance; calculating a ratio between the detected distance and the estimated distance; generating an acceptable margin of error based at least in part on the calculated ratio; and when the detected distance is within the margin of error from the estimated distance, processing the image to determine whether the image matches at least one of (1) an enrollment image that represents, at least in part, a face of an authorized user, and (2) a mathematical representation of the face of the authorized user.

Example 10B

The computer-readable storage device of example 9B, further comprising instructions for causing the at least one processor to perform operations comprising: upon determining that the image matches the enrollment image, granting authentication of the user.

Example 11B

The computer-readable storage device of example 1B, further comprising instructions for causing the at least one processor to perform operations comprising: upon denying authentication of the user, preventing the computing device from transitioning from a locked state to an unlocked state.

Example 12B

The computer-readable storage device of example 1B, further comprising instructions for causing the at least one processor to perform operations comprising: upon denying authentication of the user, denying a device communicatively coupled to the computing device permission to transition from a locked state to an unlocked state.

Example 13B

The computer-readable storage device of example 12B, wherein the device communicatively coupled to the computing device is a door lock.

Example 14B

The computer-readable storage device of example 1 B, further comprising instructions for causing the at least one processor to perform operations comprising: defining an acceptable distance range having a lower bound and an upper bound, wherein the lower bound corresponds to the threshold distance; and when the detected distance is less than the lower bound or greater than the upper bound, denying authentication of the user with respect to accessing one or more functionalities controlled by the computing device, wherein the authentication is denied independent of performing facial recognition based at least in part on the captured image.

Example 15B

The computer-readable storage device of example 1B, wherein the instructions for causing the at least one processor to detect whether the distance is less than the threshold distance comprise instructions for causing the at least one processor to perform operations comprising: measuring the distance by at least one of an optical proximity sensor, infrared proximity sensor, laser rangefinder, magnetic sensor, and sonar sensor.

Example 16B

The computer-readable storage device of example 1B, further comprising instructions for causing the at least one processor to perform operations comprising: when the distance is equal to or greater than the threshold distance, proceeding to perform a facial recognition authentication operation using the captured image.

Example 17B

The computer-readable storage device of example 1B, further comprising instructions for causing the at least one processor to perform operations comprising: outputting, by a display device of the computing device, a notification that indicates the denying of authentication of the user with respect to accessing one or more functionalities controlled by the computing device.

Example 18B

The computer-readable storage device of example 1B, wherein the instructions for causing the at least one processor to deny denying authentication comprise instructions for causing the at least one processor to perform operations comprising: denying authentication of the user prior to performing facial recognition based at least in part on the captured image.

Example 19B

The computer-readable storage device of example 1B, wherein the instructions for causing the at least one processor to deny denying authentication comprise instructions for causing the at least one processor to perform operations comprising: denying authentication of the user concurrently with performing facial recognition based at least in part on the captured image.

Example 20B

The computer-readable storage device of example 1B, wherein the instructions for causing the at least one processor to deny denying authentication comprise instructions for causing the at least one processor to perform operations comprising: denying authentication of the user after performing facial recognition based at least in part on the captured image and irrespective of one or more results of performing the facial recognition.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), non-volatile random access memory (NVRAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

In some examples, any of the described software units, modules or components may be executed as one or more distributed processes on one or more computing devices of a distributed system. In this way, workloads of any of the described software units, modules or components may be distributed across the distributed system for processing. In one example, a distributed system may include multiple autonomous computers that communicate through one or more communication channels, such as a computer network, to perform techniques implemented by the software units, modules or components.

Various examples have been described. These and other examples are within the scope of the following claims.

What is claimed is:

1. A method comprising:
receiving, by a computing device, an authentication image;
determining, by the computing device, whether a number of pixels positioned between at least two landmarks represented in the authentication image exceeds a threshold number of pixels; and
responsive to determining that the number of pixels positioned between the at least two landmarks represented in the authentication image exceeds the threshold number of pixels, denying, by the computing device, authentication with respect to accessing one or more functionalities controlled by the computing device.

2. The method of claim 1, further comprising:
identifying, by the computing device, the at least two landmarks within the authentication image; and
determining, by the computing device, the number of pixels of the image positioned between the at least two landmarks represented in the authentication image.

3. The method of claim 1, wherein the at least two landmarks include a left cornea and a right cornea of a face represented in the authentication image.

4. The method of claim 1, wherein the at least two landmarks include an ocular center and a nasal base of a face represented in the authentication image.

5. The method of claim 1, further comprising determining, by the computing device, whether a distance between an image capture device and an object represented by at least a portion of the authentication image is within a threshold distance based on the determination of whether the number of pixels positioned between the at least two landmarks represented in the authentication image exceeds the threshold number of pixels, wherein the authentication image is captured by the image capture device.

6. The method of claim 5, wherein the threshold distance is inversely proportional to the threshold number of pixels.

7. The method of claim 1, further comprising:
determining, by the computing device, a resolution of the authentication image, wherein the resolution is associated with a level of detail of the authentication image; and
setting, by the computing device, the threshold number of pixels based on the resolution of the authentication image.

8. The method of claim 7, wherein setting the threshold number of pixels comprises:
responsive to determining that the resolution of the authentication image is greater, increasing, by the computing device, the threshold number of pixels.

9. The method of claim 7, wherein determining the resolution of the authentication image comprises determining, by the computing device, the resolution of the authentication image based at least in part on one or more properties of an image capture device associated with a capture of the authentication image.

10. The method of claim 1,
wherein the at least two landmarks include a first landmark represented in the authentication image and a second landmark represented in the authentication image,
wherein the number of pixels positioned between the at least two landmarks is a first number of pixels, and
wherein the threshold number of pixels is a first threshold number of pixels, the method further comprising:
responsive to determining that the first number of pixels exceeds the first threshold number of pixels, determining, by the computing device, whether a second number of pixels positioned between a third landmark represented in the authentication image and a fourth landmark in the authentication image exceeds a second threshold number of pixels; and
responsive to determining that the second number of pixels does not exceed the second threshold number of pixels, granting, by the computing device, the authentication with respect to accessing the one or more functionalities controlled by the computing device.

11. The method of claim 1, further comprising:
responsive to determining that the number of pixels positioned between the at least two landmarks represented in the authentication image exceeds the threshold number of pixels, determining, by the computing device, whether the number of pixels positioned between the at least two landmarks represented in the authentication image exceeds the threshold number of pixels by at least a predetermined margin of error;
responsive to determining that the number of pixels positioned between the at least two landmarks represented in the authentication image exceeds the threshold number of pixels by at least the predetermined margin of error, denying, by the computing device, the authentication with respect to accessing the one or more functionalities controlled by the computing device; and
responsive to determining that the number of pixels positioned between the at least two landmarks represented in the authentication image exceeds the threshold number of pixels by less than the predetermined margin of error, granting, by the computing device, the authentication with respect to accessing the one or more functionalities controlled by the computing device.

12. A device comprising:
a memory; and
one or more processors configured to:
receive an authentication image;
determine whether a number of pixels positioned between at least two landmarks represented in the authentication image exceeds a threshold number of pixels; and
responsive to determining that the number of pixels positioned between the at least two landmarks represented in the authentication image exceeds the threshold number of pixels, deny authentication with respect to accessing one or more functionalities controlled by the device.

13. The device of claim 12, wherein the one or more processors are further configured to:
identify the at least two landmarks within the authentication image; and
determine the number of pixels of the image positioned between the at least two landmarks represented in the authentication image.

14. The device of claim 12, wherein the one or more processors are further configured to determine whether a distance between an image capture device and an object represented by at least a portion of the authentication image is within a threshold distance based on the determination of whether the number of pixels positioned between the at least two landmarks represented in the authentication image exceeds the threshold number of pixels, wherein the authentication image is captured by the image capture device.

15. The device of claim 14, wherein the threshold distance is inversely proportional to the threshold number of pixels.

16. The device of claim 12, wherein the one or more processors are further configured to:
   determine a resolution of the authentication image, wherein the resolution is associated with a level of detail of the authentication image; and
   set the threshold number of pixels based on the resolution of the authentication image.

17. The device of claim 16, wherein, to set the threshold number of pixels, the one or more processors are configured to:
   responsive to determining that the resolution of the authentication image is greater, increase the threshold number of pixels.

18. The device of claim 12,
   wherein the at least two landmarks include a first landmark represented in the authentication image and a second landmark represented in the authentication image,
   wherein the number of pixels positioned between the at least two landmarks is a first number of pixels,
   wherein the threshold number of pixels is a first threshold number of pixels, and
   wherein the one or more processors are further configured to:
      responsive to determining that the first number of pixels exceeds the first threshold number of pixels, determine whether a second number of pixels positioned between a third landmark represented in the authentication image and a fourth landmark in the authentication image exceeds a second threshold number of pixels; and
      responsive to determining that the second number of pixels does not exceed the second threshold number of pixels, grant the authentication with respect to accessing the one or more functionalities controlled by the device.

19. The device of claim 12, wherein the one or more processors are further configured to:
   responsive to determining that the number of pixels positioned between the at least two landmarks represented in the authentication image exceeds the threshold number of pixels, determine whether the number of pixels positioned between the at least two landmarks represented in the authentication image exceeds the threshold number of pixels by at least a predetermined margin of error;
   responsive to determining that the number of pixels positioned between the at least two landmarks represented in the authentication image exceeds the threshold number of pixels by at least the predetermined margin of error, deny the authentication with respect to accessing the one or more functionalities controlled by the device; and
   responsive to determining that the number of pixels positioned between the at least two landmarks represented in the authentication image exceeds the threshold number of pixels by less than the predetermined margin of error, grant the authentication with respect to accessing the one or more functionalities controlled by the device.

20. A computer-readable storage device encoded with instructions that, when executed cause one or more programmable processors of a computing device to:
   receive an authentication image;
   determine whether a number of pixels positioned between at least two landmarks represented in the authentication image exceeds a threshold number of pixels; and
   responsive to determining that the number of pixels positioned between the at least two landmarks represented in the authentication image exceeds the threshold number of pixels, deny authentication with respect to accessing one or more functionalities controlled by the computing device.

* * * * *